US012627481B2

(12) United States Patent
King et al.

(10) Patent No.: US 12,627,481 B2
(45) Date of Patent: May 12, 2026

---

(54) SYSTEM AND METHOD FOR QUANTUM-BASED DATA ENCRYPTION AND TRANSMISSION

(71) Applicant: Bank of America Corporation, Charlotte, NC (US)

(72) Inventors: Adam King, Fort Mill, SC (US); Sanjay Lohar, Mint Hill, NC (US); George Albero, Charlotte, NC (US); Matthew K. Bryant, Mt. Holly, NC (US); Naomi Verma, Apex, NC (US); David J. Dos Santos, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 47 days.

(21) Appl. No.: 18/913,045

(22) Filed: Oct. 11, 2024

(65) Prior Publication Data

US 2026/0106737 A1     Apr. 16, 2026

(51) Int. Cl.
H04L 29/06 (2006.01)
H04L 9/08 (2006.01)

(52) U.S. Cl.
CPC ................................. H04L 9/0852 (2013.01)

(58) Field of Classification Search
CPC ....... H04L 9/0852; H04L 9/0643; H04L 9/30; H04L 2209/38; H04L 9/0637; H04L 9/0618; H04L 9/3247; H04L 9/3239; H04L 9/3263; H04L 2209/56; H04L 9/0656; G06F 21/62; G06F 21/6209;

G06F 21/6218; G06F 21/6227; G06F 21/64; G06F 16/1824; G06F 21/44; G06F 21/629; G06F 16/2379; G06F 16/9027; G06Q 20/06; G06Q 20/382; G06Q 20/401; G06Q 2220/00; G06Q 20/381; G06Q 40/04; G06Q 20/3825; G06Q 20/3827; G06K 9/00577; G06K 2009/00583

See application file for complete search history.

(56) References Cited

U.S. PATENT DOCUMENTS

| | | | | |
|---|---|---|---|---|
| 9,906,311 B1* | 2/2018 | DeRose | ............... | H04B 10/614 |
| 11,509,683 B2 | 11/2022 | Vela et al. | | |
| 11,811,794 B2 | 11/2023 | Zaccak et al. | | |
| 11,856,003 B2 | 12/2023 | Kutt et al. | | |
| 12,047,400 B2 | 7/2024 | Thompson | | |
| 12,063,248 B2 | 8/2024 | Kutt et al. | | |
| 2016/0149700 A1* | 5/2016 | Fu | ......................... | H04L 9/0858 |
| | | | | 380/278 |
| 2016/0241396 A1* | 8/2016 | Fu | ......................... | H04L 9/0836 |
| 2017/0103194 A1 | 4/2017 | Wechsler | | |

(Continued)

*Primary Examiner* — Malcolm Cribbs

(57) ABSTRACT

A system for implementing security measures to a data packet is disclosed. The system assigns each computing device with a respective encryption key. A first computing device encrypts the data packet with a first encryption key upon creation and/or before transmission. The first computing device encodes the data packet with a quantum encryption key and communicates the encoded data packet to a second computing device. The second computing device determines whether the data packet is received without being intercepted. In response to determining that the data packet is received without being intercepted, the second computing device decrypts the data packet.

20 Claims, 3 Drawing Sheets

(56) References Cited

U.S. PATENT DOCUMENTS

| | | | |
|---|---|---|---|
| 2019/0245685 A1* | 8/2019 | Yoshino | H04J 7/00 |
| 2019/0377819 A1 | 12/2019 | Filliben et al. | |
| 2019/0378049 A1 | 12/2019 | Widmann et al. | |
| 2019/0378050 A1 | 12/2019 | Edkin et al. | |
| 2019/0387051 A1 | 12/2019 | Chen et al. | |
| 2021/0019674 A1 | 1/2021 | Crabtree et al. | |
| 2021/0203493 A1* | 7/2021 | Chen | H04L 9/0858 |
| 2021/0352087 A1 | 11/2021 | Ryver | |
| 2022/0006627 A1* | 1/2022 | Ko | H04L 9/0852 |
| 2022/0029797 A1* | 1/2022 | Tanaka | H04L 9/0861 |
| 2022/0201042 A1 | 6/2022 | Crabtree et al. | |
| 2023/0308465 A1 | 9/2023 | Alroobaea et al. | |
| 2023/0316076 A1 | 10/2023 | Morris et al. | |
| 2023/0370490 A1 | 11/2023 | Crabtree et al. | |
| 2023/0370491 A1 | 11/2023 | Crabtree et al. | |
| 2023/0370495 A1 | 11/2023 | Desai et al. | |
| 2024/0046318 A1 | 2/2024 | Muriqi | |
| 2024/0291853 A1 | 8/2024 | Murphy et al. | |
| 2025/0247216 A1* | 7/2025 | Abi-Farah | H04L 9/0852 |

* cited by examiner

SYSTEM AND METHOD FOR QUANTUM-BASED DATA ENCRYPTION AND TRANSMISSION

TECHNICAL FIELD

The present disclosure relates generally to network security, and more specifically to a system and method for quantum-based data encryption and transmission.

BACKGROUND

Organizations use computing devices to transmit and receive data packets to facilitate communication with other computing devices in a network. The organizations may implement certain security measures to block unauthorized data transfers to devices that are external to the organization.

SUMMARY

The disclosed system, described in the present disclosure, is particularly integrated into a practical application to improve network security and data exfiltration mitigation techniques.

In conventional systems, traditional encryption methods and firewalls may not be sufficient to reduce instances of exfiltration of data at an organization. For example, with the rise of generative artificial intelligence (AI) models, certain organizations may resort to blocking the use of generative AI models and platforms to reduce instances of data exfiltration. However, generative AI models may be beneficial if a solution is implemented to reduce (or prevent) unauthorized outgoing data from the organization's network while allowing incoming data from generative AI models to the organization's network. There is a need to establish a technique to allow the use of generative AI models and reduce the instances of data exfiltration from internal and external devices with respect to organizations.

The disclosed system is configured to provide a solution to these and other technical problems in the realm of network security. In some embodiments, the system is configured to assign each computing device with a respective encryption key and encrypt the data packet upon creation and/or communication with the respective encryption key. In this manner, the data packet is associated with a unique signature that identifies the associated computing device.

The disclosed system provides several technical improvements to the network security and data exfiltration mitigation techniques. Some of these technical improvements are described below in conjunction with certain embodiments of the disclosed system. In some embodiments, the disclosed system is configured to leverage quantum key distribution to encode data packets with quantum keys. One technical advantage of this method is that the quantum keys are associated with specific quantum particle states (e.g., photons). If the data packet is intercepted by a bad actor attempting to eavesdrop and obtain the data packet along its network path, the quantum states of the quantum particles get disturbed. This may be detected and observed by the sending and receiving devices. Furthermore, the quantum particles may be encoded with bit values using a specific measurement basis, such as diagonal, vertical, horizontal, or circular polarization. If a bad actor measures the quantum states of the quantum particles (encoded within the data packet) with another measurement basis, the data packet will not be decoded, and this incorrect measurement basis may also disturb the quantum states of the particles. In response, the sending and receiving devices may detect the disturbance in the quantum states of the particles. In some embodiments, in response, the receiving device may not decode the data packet as the data packet may be corrupted, compromised, or tampered with.

In some embodiments, the disclosed system may determine whether a data packet is sent from an unauthorized device. For example, the disclosed system may determine that a device is unauthorized if the Internet Protocol (IP) address of the device is not found in the list of authorized IP addresses. In response, the disclosed system may deny the request to receive the data packet from the unauthorized device (collectively referred to herein as anomalous data).

Thus, the disclosed system provides practical applications and technical improvements, including improving the security of data transmission within a network, and data validation techniques through quantum key validation, among others. For example, by using quantum key distribution, the disclosed system makes any unauthorized attempts to intercept data more detectable compared to the current techniques. In response to detecting unauthorized attempts to intercept data, the disclosed system is configured to mitigate the anomalous data by flagging the data as anomalous and not decoding the anomalous data. This, in turn, reduces the likelihood of the anomalous data infecting the downstream devices in the network, e.g., via malware, etc.

In another example, the disclosed system may detect disturbances in the quantum states of particles encoded in the data packet as a measurable, detectable event. Thus, the detection of unauthorized measurements of the quantum states of particles may be more evident and detectable as compared to the current encryption methods. In another example, the disclosed system may allow generative AI modes to be used within the secure network environment of the organization with reduced instances of data leakage from the organization. This, in turn, leads to improving the security of data stored at the devices involved in the data transmissions. Further, this, in turn, reduces the processing, memory, and network resources of these devices. For example, by improving the data transmission validation techniques, the devices do not have to allocate an extensive amount of processing and memory resources to combat cyber-attacks. Further, the disclosed system is configured to proactively implement security measures, including but not limited to data encryption, quantum key distribution, embedding the data with quantum particles for data obfuscation, implementing a quantum linguistic algorithm to scramble the data upon an authorized access event, and embedding the data with a unique serial number for tracking the movements of the data along its network path.

In some embodiments, a system comprises a memory operably coupled with a first processor. The memory is configured to store a first data packet. The first processor is configured to assign each computing device from among a set of computing devices with a respective encryption key, wherein assigning each computing device from among the set of computing devices with the respective encryption key comprises: assigning a first computing device with a first encryption key; and assigning a second computing device with a second encryption key, wherein the second encryption key is distinct from the first encryption key. The system further comprises the first computing device comprising a second processor. The second processor is configured to determine that the first data packet is created at the first computing device. The second processor is further configured to encrypt the first data packet with the first encryption key in response to determining that the first data packet is created at the first computing device. The second processor is further configured to receive a request to communicate the first encrypted data packet to the second computing device. The second processor is further configured to encode the first data packet with a first quantum encryption key in respect to receiving the request, wherein encoding the first data packet with the first quantum encryption key comprises generating a quantum state vector. The quantum state vector comprises a set of bit values to be used to form the quantum encryption key. The first quantum encryption key is associated with a preconfigured quantum state encoding used in encoding the first data packet with the first quantum encryption key. The preconfigured quantum state encoding comprises a horizontal, a vertical, a diagonal, or a circular polarization scheme. The second processor is further configured to communicate the encoded first data packet to the second computing device. The system further comprises the second computing device comprising a third processor. The third processor is further configured to determine that the encoded first data packet is transmitted to the second computing device without being intercepted by receiving, from the first computing device, a first measurement result associated with the quantum state vector at the first computing device, wherein the first measurement result indicates the preconfigured quantum state encoding associated with the first quantum encryption key; determining a second measurement result associated with the quantum state vector, wherein the second measurement result indicates a measured quantum state vector using a measurement basis used by the second computing device; comparing the first measurement result with the second measurement result; and determining that a difference between the first measurement result and the second measurement result is less than a threshold. The third processor is further configured to decrypt the encoded first data packet using the first quantum encryption key in response to determining that the encoded first data packet is transmitted to the second computing device without being intercepted.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
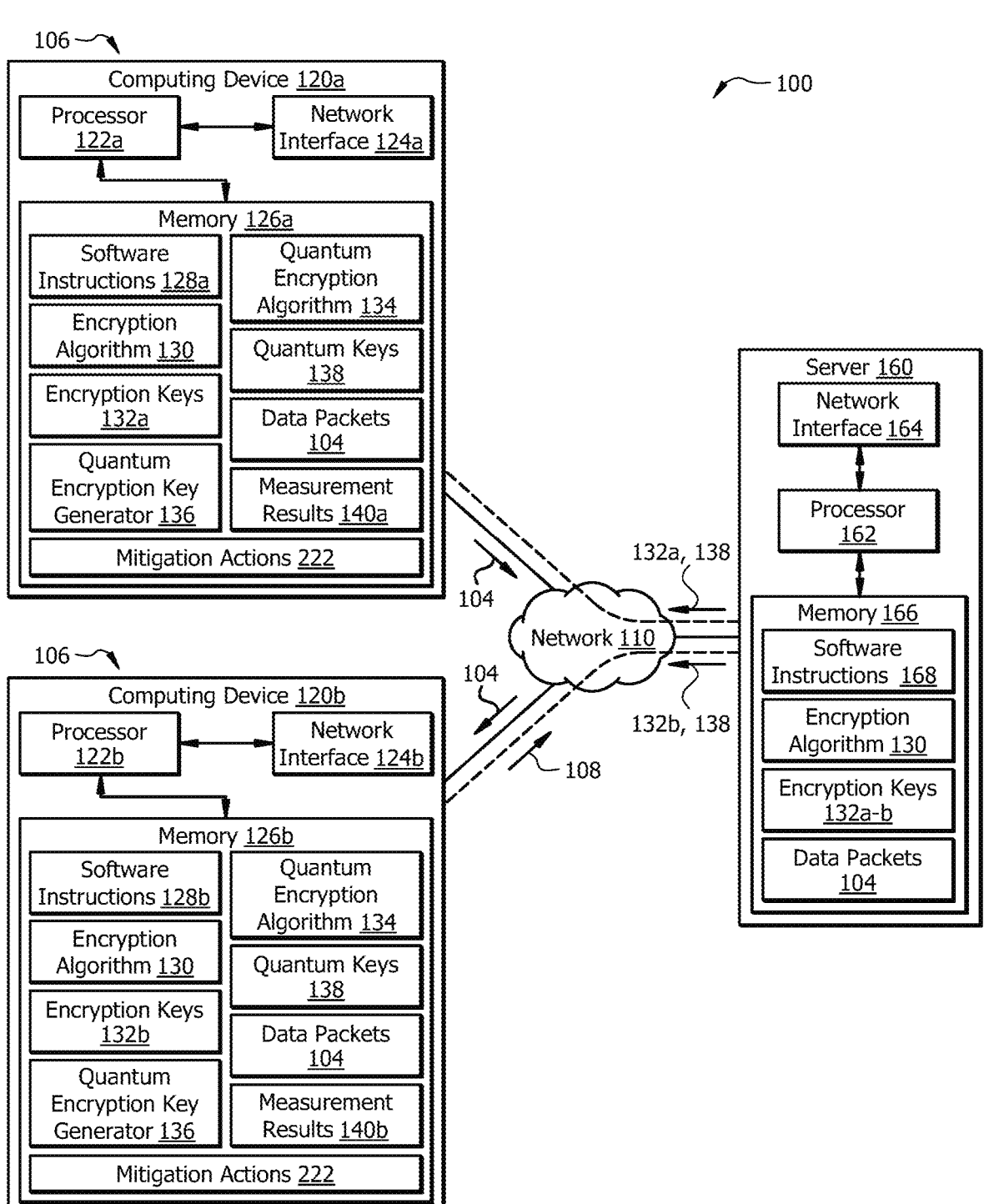
FIG. 1 illustrates an embodiment of a system configured to implement a series of security measures including but not limited to a quantum-based data encryption and transmission.
Figure 2:
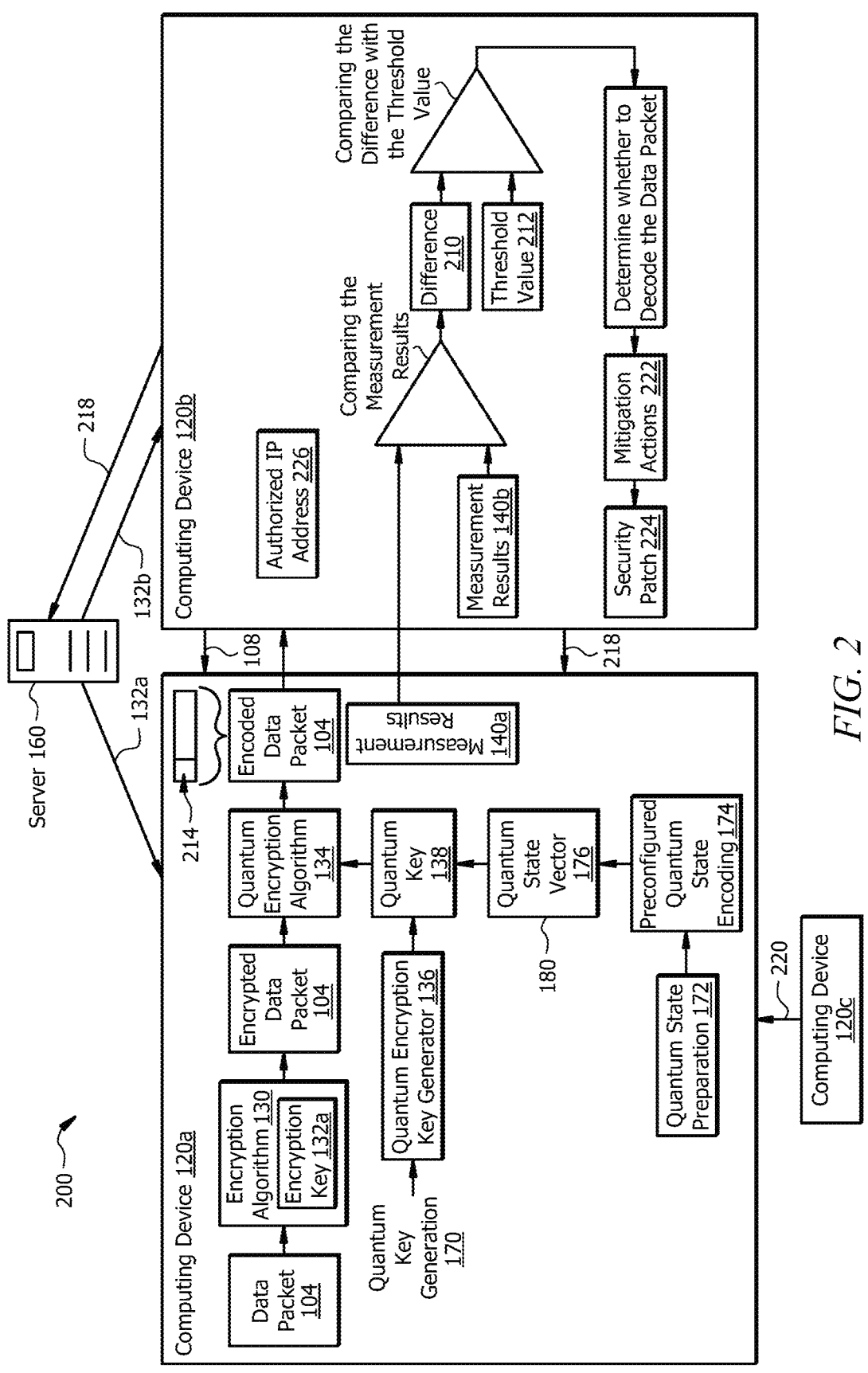
FIG. 2 illustrates an example operational flow of the system of FIG. 1.
Figure 3:
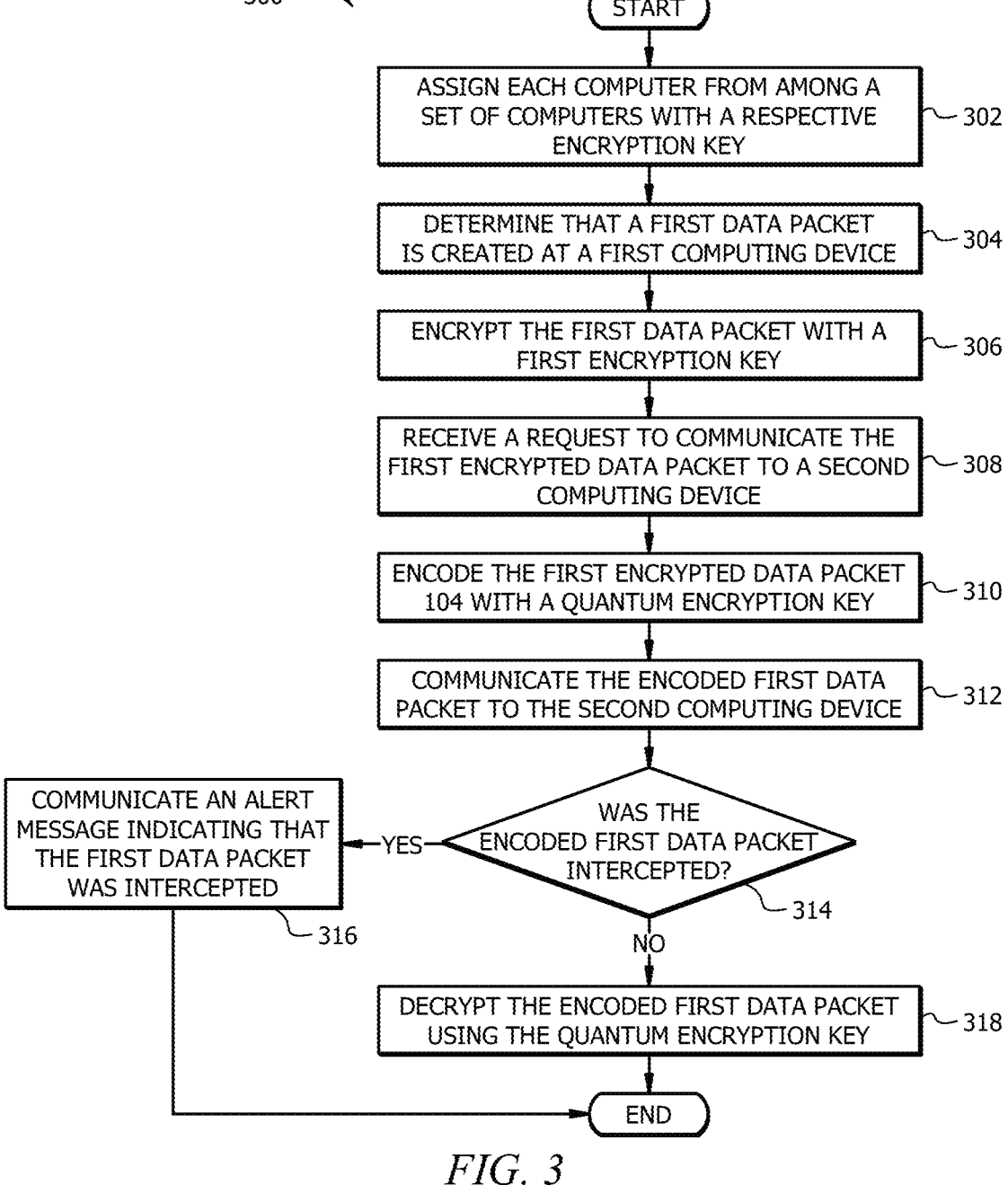
FIG. 3 illustrates an example flow chart of a method of the system of FIG. 1.

As described above, previous technologies fail to provide efficient and reliable solutions to implement a series of security measures including but not limited to quantum-based data encryption and transmission. Embodiments of the present disclosure and its advantages may be understood by referring to FIGS. 1 through 3. FIGS. 1 through 3 are used to describe systems and methods for implementing a series of security measures including but not limited to quantum-based data encryption and transmission, according to some embodiments.

System overview FIG. 1 illustrates an embodiment of a system 100 that is generally configured to implement a series of security measures including but not limited to quantum-based data encryption and transmission using quantum key distribution (QKD) to secure and validate data transmissions within a network. In some embodiments, the system 100 comprises one or more computing devices 102*a-b* communicatively coupled with a server 160 via a network 110. The network 110 enables the communication among the components of the system 100. Each computing device 120*a-b* may be used to send and receive data packets 104 to and from other devices. In other embodiments, system 100 may not have all of the components listed and/or may have other elements instead of, or in addition to, those listed above.

In general, the system 100 improves the network security and data exfiltration mitigation techniques. In conventional systems, traditional encryption methods and firewalls may not be sufficient to reduce instances of exfiltration of data at an organization. For example, with the rise of generative artificial intelligence (AI) models, certain organizations may resort to blocking the use of generative AI models and platforms to reduce instances of data exfiltration. However, generative AI models may be beneficial to organizations if a solution is implemented to reduce (or prevent) unauthorized outgoing data from the organization's network while allowing incoming data from generative AI models to the organization's network. There is a need to establish a technique to allow the use of generative AI models and reduce the instances of data exfiltration from internal and external devices with respect to organizations.

The disclosed system 100 is configured to provide a solution to these and other technical problems in the realm of network security. In some embodiments, the system 100 is configured to assign each computing device 120*a-b* with a respective encryption key 132*a-b* and encrypt the data packet 104 upon creation and/or communication with the respective encryption key 132*a-b*. In this manner, the data packet 104 is associated with a unique signature that identifies the associated computing device 120*a-b*.

In some embodiments, the system 100 is configured to leverage quantum key distribution to encode data packets 104 with quantum keys 138. One technical advantage of this method is that the quantum keys 138 are associated with specific quantum particle states (e.g., photons). If the data packet 104 is intercepted by a bad actor attempting to eavesdrop and obtain the data packet 104 along its network path, the quantum states of the quantum particles get disturbed. This may be detected and observed by the sending and receiving devices. Furthermore, the quantum particles may be encoded with bit values using a specific measurement basis, such as diagonal, vertical, horizontal, or circular polarization. If a bad actor measures the quantum states of the quantum particles (encoded within the data packet 104) with another measurement basis, the data packet 104 will not be decoded and this incorrect measurement basis may also disturb the quantum states of the particles. In response, the sending and receiving devices may detect the disturbance in the quantum states of the particles. In some embodiments, in response, the receiving device may not decode the data packet 104 as the data packet 104 may be corrupted, compromised, or tampered with.

In some embodiments, the system 100 may determine whether a data packet 104 is sent from an unauthorized device. For example, the system 100 may determine that a device is unauthorized if the Internet Protocol (IP) address of the device is not found in the list of authorized IP addresses. In response, the system 100 may deny the request to receive the data packet 104 from the unauthorized device (collectively referred to herein as anomalous data).

Thus, the disclosed system 100 provides practical applications and technical improvements, including improving the security of data transmission within a network, and data validation techniques through quantum key validation, among others. For example, by using quantum key distribution, the system 100 makes any unauthorized attempts to intercept data more detectable compared to the current techniques. In response to detecting unauthorized attempts to intercept data, the system 100 is configured to mitigate the anomalous data by flagging the data as anomalous and not decoding the anomalous data. This, in turn, reduces the likelihood of the anomalous data infecting the downstream devices in the network, e.g., malware, etc.

In another example, the system 100 may detect disturbances in quantum states of particles encoded in the data packet 104 as a measurable, detectable event. Thus, the detection of unauthorized measurements of the quantum states of particles may be more evident and detectable as compared to the current encryption methods. In another example, the system 100 may allow generative AI models to be used within the secure network environment of the organization with reduced instances of data leakage from the organization. This, in turn, leads to improving the security of data stored at the devices involved in the data transmissions. Further, this, in turn, reduces the processing, memory, and network resources of these devices. For example, by improving the data transmission validation techniques, the devices do not have to allocate an extensive amount of processing and memory resources to combat cyber-attacks. Further, the system 100 is configured to proactively implement security measures, including but not limited to data encryption, quantum key distribution, embedding the data with quantum particles for data obfuscation, implementing a quantum linguistic algorithm to scramble the data upon an authorized access event, and embedding the data with a unique serial number for tracking the movements of the data along its network path. These operations are described further below in conjunction with FIGS. 1-3.

System Components

Network

Network 110 may be any suitable type of wireless and/or wired network. The network 110 may be connected to the Internet or public network. The network 110 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., Wi-Fi, WiGig, WiMAX, etc.), a long-term evolution (LTE) network, a universal mobile telecommunications system (UMTS) network, a peer-to-peer (P2P) network, a Bluetooth network, a near-field communication (NFC) network, and/or any other suitable network. The network 110 may include fiber optics, optical fibers, and the like to implement quantum communication channels. The network 110 may be configured to support any suitable type of communication protocol as would be appreciated by one of ordinary skill in the art.

Example Computing Device

Each of the computing devices 120*a-n* is an instance of a computing device 120. The computing device 120 may generally be any device that is configured to process data and interact with users. Examples of the computing device 120 include, but are not limited to, a personal computer, a desktop computer, a workstation, a server, a laptop, a tablet computer, a mobile phone (such as a smartphone), smart glasses, Virtual Reality (VR) glasses, a virtual reality device, an augmented reality device, an Internet-of-Things (IoT) device, or any other suitable type of device. The computing device 120 may include a user interface, such as a display, a microphone, a camera, a keypad, or other appropriate terminal equipment usable by user 102.

Each computing device 120 may include a hardware processor, memory, and/or circuitry configured to perform any of the functions or actions of the computing device 120 described herein. For example, the computing device 120 includes a processor in signal communication with a network interface and a memory. The memory stores software instructions (e.g., code) that, when executed by the processor, cause the processor to perform one or more operations of the computing device 120 described herein. The user may use the computing device 120*a* to initiate the communication of the data packet 104 to the computing device 120*b*.

In some examples, the data packet 104 may include a document, a file, an image, an audio file, and a video file, among others. The data packet 104 may include headers that indicate the source network node, intermediate network nodes along the network path of the data packet 104, a destination network node for the data packet 104, the type of data contained in the data packet 104, and any encryption or security protocols applied to the packet 104.

The computing device 120*a* includes a processor 122*a* in signal communication with a network interface 124*a* and a memory 126*a*. The memory 126*a* stores software instructions 128*a* that when executed by the processor 122*a* cause the processor 122*a* to perform one or more operations of the computing device 120*a* described herein. The computing device 120*a* is configured to communicate with other devices and components of the system 100 via the network 110. The computing device 120*a* may be associated with a user. The computing device 120*a* may be used to transfer data packet 104.

Processor 122*a* comprises one or more processors. The processor 122*a* is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). For example, one or more processors may be implemented in cloud devices, servers, virtual machines, and the like. The processor 122*a* may be a programmable logic device, a microcontroller, a microprocessor, or any suitable number and combination of the preceding. The one or more processors are configured to process data and may be implemented in hardware or software. For example, the processor 122*a* may be 8-bit, 16-bit, 32-bit, 64-bit, or of any other suitable architecture. The processor 122*a* may include an arithmetic logic unit (ALU) for performing arithmetic and logic operations. The processor 122*a* may register the supply operands to the ALU and store the results of ALU operations. The processor 122*a* may further include a control unit that fetches instructions from memory and executes them by directing the coordinated operations of the ALU, registers, and other components. The one or more processors are configured to implement various software instructions. For example, the one or more processors are configured to execute instructions (e.g., software instructions 128*a*) to perform the operations of the computing device 120*a* described herein. In this way, processor 122*a* may be a special-purpose computer designed to implement the functions disclosed herein. In an embodiment, the processor 122*a* is implemented using logic units, FPGAs, ASICs, DSPs, or any other suitable hardware. The processor 122*a* is configured to operate as described in FIGS. 1-3. For example, the processor 122*a* may be configured to perform one or more operations of the operational flow 200 as described in FIG. 2, and one or more operations of the method 300 as described in FIG. 3.

Network interface 124*a* is configured to enable wired and/or wireless communications. The network interface 124*a* may be configured to communicate data between the computing device 120*a* and other devices, systems, or domains. For example, the network interface 124*a* may comprise an NFC interface, a Bluetooth interface, a Zigbee interface, a Z-wave interface, a radio-frequency identification (RFID) interface, a Wi-Fi interface, a local area network (LAN) interface, a wide area network (WAN) interface, a metropolitan area network (MAN) interface, a personal area network (PAN) interface, a wireless PAN (WPAN) interface, a modem, a switch, and/or a router. The processor 122*a* may be configured to send and receive data using the network interface 124*a*. The network interface 124*a* may be configured to use any suitable type of communication protocol.

The memory 126*a* may be a non-transitory computer-readable medium. The memory 126*a* may be volatile or non-volatile and may comprise read-only memory (ROM), random-access memory (RAM), ternary content-addressable memory (TCAM), dynamic random-access memory (DRAM), and/or static random-access memory (SRAM). The memory 126*a* may include one or more of a local database, a cloud database, a network-attached storage (NAS), etc. The memory 126*a* comprises one or more disks, tape drives, or solid-state drives, and may be used as an over-flow data storage device, to store programs when such programs are selected for execution, and to store instructions and data that are read during program execution. The memory 126*a* may store any of the information described in FIGS. 1-3 along with any other data, instructions, logic, rules, or code operable to implement the function(s) described herein when executed by processor 122*a*.

For example, the memory 126*a* may store software instructions 128*a*, encryption algorithm 130, encryption keys 132*a*, quantum encryption algorithm 134, quantum encryption key generator 136, quantum keys 138, data packets 104, measurement results 140*a*, and/or any other data or instructions described herein. The software instructions 128*a* may comprise any suitable set of instructions, logic, rules, or code operable to execute the processor 122*a* and perform the functions described herein, such as some or all of those described in FIGS. 1-3.

The encryption algorithm 130 may be implemented by one or more processors (e.g., processors 122*a*, 122*b*, and 162) executing software instructions (e.g., software instructions 128*a*, 128*b*, and 168) and is generally configured to encrypt data packets 104 with encryption keys 132*a*. For example, at computing device 120*a*, the encryption algorithm 130 may be implemented by the processor 122*a* executing software instructions 128*a* and is generally configured to encrypt data packets 104 with encryption keys 132*a*. In some embodiments, the encryption algorithm 130 may include advanced encryption standard (AES), data encryption standard (DES), among others. In some embodiments, the encryption process using the encryption algorithm 130 may include encryption key generation and data encoding, such as padding, among others. The encryption key 138 may be generated by a random key generator logic code included in the encryption algorithm 130.

The quantum encryption algorithm 134 may be implemented by the one or more processors (e.g., processors 122*a*, 122*b*, and 162) executing software instructions (e.g., software instructions 128*a*, 128*b*, and 168) and is generally configured to encode data packets 104 with quantum keys 138. For example, at the computing device 120*a*, quantum encryption algorithm 134 may be implemented by the one or more processors 122*a* executing software instructions 128*a*. In some embodiments, the quantum encryption algorithm 134 may be a quantum one-time pad where quantum keys 138 generated through quantum key distribution by the quantum encryption key generator 136. In a quantum one-time pad, each bit of the data packet 104 is encrypted using a corresponding qubit from the quantum key 138.

In some embodiments, the quantum encryption algorithm 134 may be implemented by lattice-based cryptography, among others. In some embodiments, the encoding of the data packet 104 with the quantum key 138 may include a bitwise exclusive OR (XOR) logic gate operation between each bit in the data packet 104 with the counterpart qubit in the quantum key 138.

In some embodiments, the quantum encryption algorithm 134 may be implemented by a computing device 120*a*-*b* using the quantum key 138 to encode and decode data packet 104 upon transmitting and receiving, respectively. For example, a computing device 120*a* may encode the data packet 104 using the quantum encryption algorithm 134 before transmitting it to another computing device 120*b*. When the data packet 104 is received at the intended computing device 120*b*, the computing device 120*b* may use the quantum encryption algorithm 134 to decode the data packet 104 using the encryption key 138. In some embodiments, the quantum encryption algorithms 134 (e.g., quantum key distribution algorithms) enable the generation and distribution of quantum keys 138 with unconditional security. This may mitigate the interception and eavesdropping by malicious actors. The quantum-secured communication channels allow for end-to-end confidentiality and integrity of data packets 104 and lead to protection of sensitive information from unauthorized access or tampering.

The quantum encryption key generator 136 may be implemented by the processor (e.g., processor 122*a*, 122*b*) executing the software instructions (e.g., software instructions 128*a*, 128*b*) and configured to generate quantum encryption/decryption keys 138. For example, at computing device 120*a*, the quantum encryption key generator 136 may be implemented by the processor 122*a* executing the software instructions 128*a*. In some embodiments, the quantum encryption key generator 136 may include quantum cryptography algorithms, among other algorithms. In some embodiments, the quantum encryption key generator 136 may be implemented by the principles of quantum mechanics to create the quantum encryption key 138 that is resilient to cyberattacks, including non-quantum cyberattacks from traditional computer systems and quantum cyberattacks from quantum computer systems. To this end, the quantum encryption key generator 136 generates the quantum encryption key 138 which has a set of quantum states. In some examples, the quantum states may be represented as quantum bits (qubits). The qubits may represent quantum uncertainty, where their values are not defined or known until measured with a correct or predefined measurement basis. In some examples, the qubits may include four quantum states, 00, 01, 10, and 11.

The process of generating the quantum encryption key 138 may include generating the set of quantum states of the quantum encryption key 138 according to the principle of quantum mechanics. For example, the set of quantum states may have and exhibit quantum properties, such as superposition and entanglement. The quantum encryption key generator 136 may arrange the quantum states (for example, the qubits) in a particular arrangement that may be used to detect any deviation from the particular arrangement as an unauthorized attempt to access the data packet 104 encrypted with the quantum key 138.

In some embodiments, the quantum encryption key generator 136 may be included or executed in conjunction with a quantum circuit that is configured to generate the quantum encryption key 138 based on the quantum cryptography algorithms. For example, the quantum circuit may be or include a physical representation of a series of quantum operations or quantum gates (e.g., XOR, etc.) that are applied to the set of qubits to perform quantum computation to generate the quantum keys 138 and other operations. The quantum property of the quantum encryption key 138 may provide a quantum representation as qubits to encode with (e.g., encrypt) the data packet 104.

The generated quantum encryption key 138 has quantum states of particles, such as photons. The quantum encryption key 138 may be generated by encoding information in the quantum states of each photon. The quantum encryption key generator 136 may generate a random sequence of quantum states (e.g., qubits) for the quantum encryption key 138. The quantum encryption key generator 136 prepares the quantum states to generate the quantum encryption key 138. The quantum states are used to generate the quantum encryption key 138 based on various properties of photons, such as their polarization or the basis on which they are measured.

In an example scenario, the data packet 104 may be encoded with quantum key 138 and sent to the computing device 120b. The computing device 120b receives the quantum states of the quantum encryption key 138 and measures them based on a predefined measurement basis that is previously provided to the computing device 120b. Thus, the computing device 120b may obtain the quantum encryption key 138 based on the predefined measurement basis. Since the sender device (e.g., the computing device 120a) and the receiver device (e.g., the computing device 120b) share the same quantum states and the measurements at the receiver device align with the preparation of the quantum states at the sender device, these devices may use the quantum distribution channel (e.g., as a part of the network 110) for secure communication of the data packet 104 and quantum encryption key 138. If a bad actor attempts to access the data packet 104 encrypted with the quantum key 138, the quantum state of the key gets disturbed and this anomaly is detected by the computing device 120a, computing device 120b, and server 160. These devices may generate alert messages indicating the attempt to access the data packet 104 and display the alert messages on their display screens.

In another anomaly detection scenario, if the data packet 104 is attempted to be decrypted without the predefined measurements set for measuring the quantum state of the encryption key 138, it may lead to disturbance in the quantum states of the particles. This, in turn, may lead to misalignment in the quantum states of the encryption key 138. Therefore, this anomaly is detected by the server 160, the computing device 120a, and computing device 120b.

These devices may generate alert messages indicating the attempt to access the data packet 104 and display the alert messages on their display screens.

The computing device 120b includes a processor 122b in signal communication with a network interface 124b and a memory 126b. The memory 126b stores software instructions 128b that when executed by the processor 122b cause the processor 122b to perform one or more operations of the computing device 120b described herein. The computing device 120b is configured to communicate with other devices and components of the system 100 via the network 110. The computing device 120b may be associated with the user. The computing device 120b may be used to request 108 to receive the data packet 104.

Processor 122b comprises one or more processors. The processor 122b is any electronic circuitry, including, but not limited to, state machines, one or more CPU chips, logic units, cores (e.g., a multi-core processor), FPGAs, ASICs, or DSPs. For example, one or more processors may be implemented in cloud devices, servers, virtual machines, and the like. The processor 122b may be a programmable logic device, a microcontroller, a microprocessor, or any suitable number and combination of the preceding. The one or more processors are configured to process data and may be implemented in hardware or software. For example, the processor 122b may be 8-bit, 16-bit, 32-bit, 64-bit, or of any other suitable architecture. The processor 122b may include an ALU for performing arithmetic and logic operations. The processor 122b may register the supply operands to the ALU and store the results of ALU operations. The processor 122b may further include a control unit that fetches instructions from memory and executes them by directing the coordinated operations of the ALU, registers, and other components. The one or more processors are configured to implement various software instructions. For example, the one or more processors are configured to execute instructions (e.g., software instructions 128b) to perform the operations of the computing device 120b described herein. In this way, processor 122b may be a special-purpose computer designed to implement the functions disclosed herein. In an embodiment, the processor 122b is implemented using logic units, FPGAs, ASICs, DSPs, or any other suitable hardware. The processor 122b is configured to operate as described in FIGS. 1-3. For example, the processor 122b may be configured to perform one or more operations of the operational flow 200 as described in FIG. 2, and one or more operations of the method 300 as described in FIG. 3.

Network interface 124b is configured to enable wired and/or wireless communications. The network interface 124b may be configured to communicate data between the computing device 120b and other devices, systems, or domains. For example, the network interface 124b may comprise an NFC interface, a Bluetooth interface, a Zigbee interface, a Z-wave interface, an RFID interface, a Wi-Fi interface, a LAN interface, a WAN interface, a MAN interface, a PAN interface, a WPAN interface, a modem, a switch, and/or a router. The processor 122b may be configured to send and receive data using the network interface 124b. The network interface 124b may be configured to use any suitable type of communication protocol.

The memory 126b may be a non-transitory computer-readable medium. The memory 126b may be volatile or non-volatile and may comprise ROM, RAM, TCAM, DRAM, and/or SRAM. The memory 126b may include one or more of a local database, a cloud database, a NAS, etc. The memory 126b comprises one or more disks, tape drives, or solid-state drives, and may be used as an over-flow data storage device, to store programs when such programs are selected for execution, and to store instructions and data that are read during program execution. The memory 126b may store any of the information described in FIGS. 1-3 along with any other data, instructions, logic, rules, or code operable to implement the function(s) described herein when executed by processor 122b. For example, the memory 126b may store software instructions 128b, encryption algorithm 130, encryption keys 132b, quantum encryption algorithm 134, quantum encryption key generator 136, quantum keys 138, data packets 104, measurement results 140b, and/or any other data or instructions described herein. The software instructions 128b may comprise any suitable set of instructions, logic, rules, or code operable to execute the processor 122b and perform the functions described herein, such as some or all of those described in FIGS. 1-3.

The encryption algorithm 130 may be implemented by the processor 122b executing software instructions 128b and is generally configured to encrypt data packets 104 with encryption keys 132b. The operations of the encryption algorithm 130 are described above with respect to the computing device 120a. The quantum encryption algorithm 134 may be implemented by the processor 122b, executing software instructions 128b and is generally configured to encode data packets 104 with quantum keys 138. The operations of the quantum encryption algorithm 134 are described above with respect to the computing device 120a. The quantum encryption key generator 136 may be implemented by the processor 122b executing the software instructions 128b. The operations of the quantum encryption key generator 136 are described with respect to the computing device 120a.

Example Server

The server 160 generally includes a hardware computer system configured to implement a quantum-based data transmission, quantum-enabled data validation using quantum key distribution to secure and validate data packet transmissions within a network, and anomaly detection and mitigation in a network, among others. In certain embodiments, the server 160 may be implemented by a cluster of computing devices, such as virtual machines. For example, the server 160 may be implemented by a plurality of computing devices using distributed computing and/or cloud computing systems in a network. In certain embodiments, the server 160 may be configured to provide services and resources (e.g., data and/or hardware resources, quantum keys 150, countermeasure actions, etc.) to other components and devices. In some embodiments, each of the server 160 and computing devices 120a-b may be among the quantum key distribution nodes configured to generate quantum keys 138.

Server 160 may comprise a processor 162 operably coupled with a network interface 164 and a memory 166. Processor 162 comprises one or more processors. The processor 162 is any electronic circuitry, including, but not limited to, state machines, one or more CPU chips, logic units, cores (e.g., a multi-core processor), FPGAs, ASICs, or DSPs. For example, one or more processors may be implemented in cloud devices, servers, virtual machines, and the like. The processor 162 may be a programmable logic device, a microcontroller, a microprocessor, or any suitable number and combination of the preceding. The one or more processors are configured to process data and may be implemented in hardware or software. For example, the processor 162 may be 8-bit, 16-bit, 32-bit, 64-bit, or of any other suitable architecture. The processor 162 may include an ALU for performing arithmetic and logic operations. The processor 162 may register the supply operands to the ALU and store the results of ALU operations. The processor 162 may further include a control unit that fetches instructions from memory and executes them by directing the coordinated operations of the ALU, registers, and other components. The one or more processors are configured to implement various software instructions. For example, the one or more processors are configured to execute instructions (e.g., software instructions 168) to perform the operations of the server 160 described herein. In this way, processor 162 may be a special-purpose computer designed to implement the functions disclosed herein. In an embodiment, the processor 162 is implemented using logic units, FPGAs, ASICs, DSPs, or any other suitable hardware. The processor 162 is configured to operate as described in FIGS. 1-3. For example, the processor 162 may be configured to perform one or more operations of the operational flow 200 of the system 100 described in FIG. 2 and one or more operations of the method 300 as described in FIG. 3.

Network interface 164 is configured to enable wired and/or wireless communications. The network interface 164 may be configured to communicate data between the server 160 and other devices, systems, or domains. For example, the network interface 164 may comprise an NFC interface, a Bluetooth interface, a Zigbee interface, a Z-Wave interface, a RFID interface, a WI-FI interface, a LAN interface, a WAN interface, a MAN interface, a PAN interface, a WPAN interface, a modem, a switch, and/or a router. The processor 162 may be configured to send and receive data using the network interface 164. The network interface 164 may be configured to use any suitable type of communication protocol.

The memory 166 may be a non-transitory computer-readable medium. The memory 166 may be volatile or non-volatile and may comprise ROM, RAM, TCAM, DRAM, and/or SRAM. The memory 166 may include one or more of a local database, a cloud database, a NAS, etc. The memory 166 comprises one or more disks, tape drives, or solid-state drives, and may be used as an over-flow data storage device, to store programs when such programs are selected for execution, and to store instructions and data that are read during program execution. The memory 166 may store any of the information described in FIGS. 1-3 along with any other data, instructions, logic, rules, or code operable to implement the function(s) described herein when executed by processor 162. For example, the memory 166 may store software instructions 168, encryption algorithm 130, encryption keys 132a-b, data packets 104, and/or any other data or instructions. The software instructions 168 may comprise any suitable set of instructions, logic, rules, or code operable to execute the processor 162 and perform the functions described herein, such as some or all of those described in FIGS. 1-3. The encryption algorithm 130 may be implemented by the processor 162 executing software instructions 168 and is generally configured to generate encryption keys 132a-b. The operations of the encryption algorithm 130 are described above with respect to the computing device 120a. In response to generating the encryption keys 132a-b, the server 160 may assign each computing device 120a-b with an encryption key 132a-b, respectively, and send the respective encryption key 132a-b to the associated computing device 120a-b. For example, the server 160 may send the encryption key 132a to the computing device 120a and send the encryption key 132b to the computing device 120b.

In some embodiments, the encryption keys 132a-b may be generated by the server 160 and provided to the computing devices 120a-b, respectively. In some embodiments, the encryption keys 132*a-b* may be generated by the computing devices 120*a-b*, respectively in response to the server 160 instructing each computing device 120*a-b* to generate the respective encryption key 138*a-b*.

Operational Flow to Implement a Series of Security Measures to Data Packets

FIG. 2 illustrates an example operational flow 200 of system 100 (see FIG. 1) to implement a series of security measures to the data packet 104. In some embodiments, a security measure may include assigning each computing device 120*a-b* with a respective encryption key 132*a-b* and encrypting the data packet 104 with the encryption key 132. In such embodiments, the system server 160 may assign each computing device 120*a-b* from among the set of computing devices 120*a-b* with a respective encryption key 138*a-b*. The set of computing devices 120*a-b* may be referred to as banded devices that are associated with organization 106 and connected to the intranet communication of organization 106. For example, the server 160 may assign the first computing device 120*a* with the first encryption key 132*a* and assign the second computing device 120*b* with the second encryption key 132*b*. Each encryption key 132*a-b* may be unique and distinct from other keys. In some embodiments, an encryption key 132*a-b* may be used as an identifier to identify the associated computing device 120*a-b*, respectively. In some embodiments, in response to assigning each computing device 120*a-b* with a respective encryption key 132*a-b*, the server 160 may send the encryption keys 132*a-b* to the computing devices 120*a-b*, respectively. In some embodiments, the computing devices 120*a-b* may generate the encryption keys 132*a-b*, respectively, similar to that described above.

The data packet 104 may be encrypted with the encryption key 132*a-b* upon creation and/or before transmission. For example, the computing device 120*a* may determine that the data packet 104 is created at the computing device 120*a*, e.g., in response to certain operations, such as data transformation, data input from a user, a software application outputting the data packet 104, etc. In response, the computing device 120*a* may encrypt the data packet 104 with the first encryption key 132*a*.

In an example scenario, assume that a user operating the computing device 120*b* uses the computing device 120*b* to send a request 108 to communicate the first encrypted data packet 104 to the computing device 120*b*. In response, in some embodiments, certain security measures may be implemented on the data packet 104 before transmission, e.g., encrypting the data packet 104 with the encryption key 132*a*, etc. The corresponding description below describes some examples of the security measures according to certain embodiments.

Generating a Quantum Key

In some embodiments, a security measure may include implementing a quantum key distribution and encoding the data packet 104 with a quantum key 138. To this end, the quantum key 138, e.g., via the quantum key generator 136, may be generated through the quantum key generation 170. In some embodiments, the process of quantum key generation 170 may begin with a quantum state preparation 172, where specific quantum states of quantum particles, such as photons, are generated and prepared according to specific properties, such as measurement basis and predefined quantum state encoding 174. In some embodiments, the measurement basis may include diagonal, vertical, horizontal, or circular polarization for the photons. The quantum states of the particles (e.g., photons) may be represented by specific bit values, such as 00, 01, 10, or 11.

In the preconfigured quantum state encoding 174, the quantum states of the particles are encoded and set according to the predefined encoding scheme, such as horizontal, vertical, diagonal, or circular polarization to configure the quantum states of the quantum particles. The measurement basis for encoding the quantum states may define how the quantum states are prepared and measured. The output of the preconfigured quantum state encoding 174 is the quantum state vector 176 which includes a set of bit values 180 that are used to form the quantum encryption key 138. The set of bit values 180 may represent the encoded quantum states of the quantum particles. For example, in some embodiments, the set of bit values 180 may be random bits generated by a random bit sequence generator (included in the quantum key generator 136). The bit values 180 may include qubits, for example. In some embodiments, the quantum encryption key 138 may be formed from the set of bit values 180 obtained from a measurement of the quantum state vector 176. For example, the measurement process may include detecting the states of the quantum particles. The generated quantum key 138 may be encoded with the data packet 104.

Continuing the example scenario where the data packet 104 is to be sent from the computing device 120*a* to the computing device 120*b*, assume that the data packet 104 is encrypted with the encryption key 132*a* at the computing device 120*b*. In response to receiving the request 108 to communicate the first encrypted data packet 104 to the computing device 120*b*, the computing device 120*a* may encode the data packet 104 with the first quantum encryption key 138.

In some embodiments, encoding the data packet 104 with the quantum key 138 may include generating the quantum key 138, similar to that described above. The quantum key 138 may be represented by the quantum state vector 176 which comprises a set of bit values 180 that are used to form the quantum key 138. The quantum key 138 may be associated with the predefined quantum state encoding 174 used in encoding the data packet 104 with the quantum key 138. The preconfigured quantum state encoding 174 may comprise a horizontal, vertical, diagonal, or circular polarization scheme for the quantum particles. The quantum key 138 may be associated with the predefined measurement basis, similar to that described above.

In response to generating the quantum key 138, the computing device 120*a* may encode the data packet 104 with the quantum key 138. This process may include feeding the data packet 104 to the quantum encryption algorithm 134 and performing an encryption operation by the quantum encryption algorithm 134 that uses the quantum key 138 to transform the data packet 104 into an encrypted (e.g., encoded) format. The encrypted (e.g., encoded) format of the data packet 104 may be represented by a set of quantum states that correspond to the bit values of the data packet 104 encoded with the quantum key 138, e.g., each bit in the data packet 104 may be XORed with the counterpart bit value 180. In response, the computing device 120*a* may communicate the encoded data packet 104 to the computing device 120*b*, e.g., via a quantum channel that includes fiber optic communication links in the network 110. The computing device 120*b* may receive the data packet 104.

Determining Whether the Data Packet is Anomalous

In some cases, a bad actor may attempt to access the data packet 104, e.g., cyberattacks. In response to receiving the data packet 104, the computing device 120*b* may determine whether the data packet 104 is anomalous, i.e., whether the data packet 104 was accessed by or otherwise intercepted by a third party along its network path. In this process, in some embodiments, the computing device 120*b* may determine whether the encoded data packet 104 is transmitted to the computing device 120*b* without being intercepted by evaluating the measurement results 140*a-b*.

The computing device 120*b* may receive the measurement results 140*a* associated with the quantum state vector 176 from the computing device 120*a*. The measurement results 140*a* may indicate the expected, predefined quantum state encoding 174 associated with the quantum key 138. The measurement results 140*a* may represent the original polarization states and measurement bases used during encoding the data packet 104 with the quantum key 138.

The computing device 120*b* may determine a second measurement result 140*b* associated with the quantum state vector 176. The second measurement result 140*b* may indicate a measured quantum state vector 176 and the corresponding measurement basis used by the computing device 120*b* to decode the data packet 104. The measurement result 140*b* may indicate the actual states of the quantum particles encoded in the data packet 104 observed by the computing device 120*b*. In some embodiments, the computing device 120*b* may be provided with the measurement basis from the computing device 120*a* to decode the data packet 104. In some embodiments, the computing device 120*b* may use a set of random measurement bases to re-measure the states of the quantum particles encoded in the data packet 104.

The computing device 120*b* may compare the measurement results 140*a* with the measurement results 140*b*. The computing device 120*b* may determine a difference 210 between the measurement results 140*a* and the measurement results 140*b*. If the computing device 120*b* determines that the difference 210 between the measurement results 140*a-b* is more than a threshold value 212, the computing device 120*b* may determine that data packet 104 has been intercepted, tampered with, or compromised during transmission (collectively referred to herein as anomalous). Otherwise, if difference 210 between the measurement results 140*a-b* is less than the threshold value 212, the computing device 120*b* may determine that the data packet 104 was transmitted without being intercepted or unauthorized attempt to access. In some examples, the threshold value 212 may be predefined error rate, such as 15%, 10%, etc. which represents a maximum acceptable percentage of discrepancies between the measurement results 140*a-b*.

The difference 210 between the measurement results 140*a* and 140*b* may be a result of a disturbance in the quantum states of the quantum particles indicated in the quantum state vector 176 associated with the data packet 104, e.g., as a result of a bad actor attempting to measure or measuring the quantum states with a measurement basis other than the predefined measurement basis associated with the quantum key 138 and the quantum state vector 176, and/or as a result of the measurement event itself.

If it is determined that the data packet 104 is intercepted (or tampered with) before being received at the second computing device 120*b*, the computing device 120*b* may perform one or more mitigation actions 222. The one or more mitigation actions 222 may include communicating an alert message 218 to the computing device 120*a* and the server 160, where the alert message 218 may indicate that the encoded data packet 104 is intercepted before being received at the computing device 120*b*. In some embodiments, the mitigation actions 222 may include deploying a security patch 224 to address the point of data breach where the data packet 104 was intercepted. For example, either or any of the computing devices 120*a-b* and server 160 may execute or implement the security patch 224. The security patch 224 may include code or logic instructions to update and/or reconfigure an affected network node and/or communication channels to address the security vulnerability point. In response, the security patch 224 may be communicated to the affected network node and/or communication channel. For example, the security patch 224 may include an updated firewall policy, an updated encryption algorithm 130, an updated quantum encryption algorithm 134, and indication of authorized network ports, among others.

In response to determining that the data packet 104 is transmitted to the computing device 120*b* without being intercepted, the computing device 120*b* may decrypt (or decode) the data packet 104 using the quantum key 138. In this process, the computing device 120*b* may feed the data packet 104 to the quantum encryption/decryption algorithm 134 to reverse the initial encryption process.

In some embodiments, a security measure may include tracking the network path of the data packet 104 via a unique serial number. For example, the computing device 120*a* may append the data packet 104 with a unique serial number 214. For example, when the data packet 104 comprises an image, the unique serial number 214 may be embedded in a pixel of the image, when the data packet 104 comprises an audio file, the unique serial number 214 may be embedded as frequency bands associated with a portion of the audio file, when the data packet 104 comprises a file, the unique serial number 214 may be embedded as part of the file. The computing device 120*a* may track the network path of the data packet 104 by tracking the unique serial number 214 at each network node where the data packet 104 is received and traversed.

In some embodiments, a security measure may include restricting transmitting the data packet 104 to authorized devices. For example, assume that the computing device 120*a* receives a request 220 from a third computing device 120*c* to transmit the data packet 104 to the computing device 120*c*, where the request 220 may include an IP address associated with the computing device 120*c*. The computing device 120*a* may search for the IP address of the computing device 120*c* in a list of authorized IP addresses 226. If the computing device 120*a* determines that the IP address of the computing device 120*c* is not in the list of authorized IP addresses 226, the computing device 120*a* may deny the request 220.

In some embodiments, a security measure may include embedding the data packet with quantum particles that are configured to project holograms to mask and obfuscate the data packet 104. For example, the holographic elements react to unauthorized access attempts, obfuscating the data on off-band devices and making tampering evident. An off-banded device may be a device that is not associated with the organization 106. Omni-dimensional light patterns generated by quantum particles are embedded into the data packet 104 as holographic watermarks. These patterns are complex and multi-dimensional, making them extremely difficult to replicate or alter. The watermarks may remain dormant and activate only in the presence of off-banded devices or data capture events. The holographic elements react to unauthorized access attempts, creating visible distortions or alerts. The watermarks are embedded at the point of data packet creation and remain inactive until an off-banded access attempt is detected. This method facilitates that data integrity is maintained and unauthorized access is easily identifiable and obstructed. Therefore, the data packet 104 may be obfuscated when it is received at an off-banded device.

In some embodiments, a security measure may include implementing a quantum linguistic algorithm. For example, the quantum linguistic algorithm may introduce ambiguity into the text (included in the data packet 104), making it impossible for unauthorized devices to interpret or reproduce the text accurately. Text data is encoded at the point of generation, ensuring that only authorized devices can decipher it. The quantum linguistic algorithm may protect textual data from being readable by unauthorized entities, maintaining confidentiality and integrity.

In some embodiments, a security measure may include quantum-resistant formatting. For example, data formats for the data packet 104 may be designed with resistance to quantum decryption techniques, incorporating complex algorithms and patterns that are hard to decrypt. In some embodiments, a security measure may include quantum secure printing. Secure printing protocols use advanced cryptographic methods to prevent unauthorized reproduction of printed data. This includes embedding invisible markers or codes that can only be interpreted by authorized devices. Data formats and print protocols are designed to resist advanced decryption methods, ensuring secure handling of output. This method may protect data in physical formats, preventing unauthorized duplication or interpretation.

In some embodiments, a security measure may include randomized steganography. For example, steganographic beacons, which are randomized and invisible to the naked eye, are embedded within the data packet 104. The beacons may include serial numbers 214 embedded in a small portion of the data packet 104 and may be detected and read by authorized tracking systems to monitor the movement and access of the data packet 104. The steganographic beacons may be embedded in data files, enabling tracking and monitoring of data movement. The steganographic beacons may provide an additional layer of security by enabling the detection and control of data distribution, preventing unauthorized data exfiltration. In some embodiments, a security measure may include frequency hopping to change the frequency bands on which the data packet 104 is transmitted.

Example Method for Implementing Quantum-Based Data Security

FIG. 3 illustrates an example flowchart of a method 300 for implementing a quantum-based data security system, according to some embodiments. Modifications, additions, or omissions may be made to method 300. Method 300 may include more, fewer, or other operations. For example, operations may be performed in parallel or in any suitable order. While at times it is discussed that the system 100, computing devices 120a-b, server 160, or components of any of thereof perform some operations, any suitable system or components of the system may perform one or more operations of the method 300. For example, one or more operations of method 300 may be implemented, at least in part, in the form of software instructions 128a, 128b, 168 of FIG. 1, stored on a tangible non-transitory machine-readable medium (e.g., memory 126a, 126b, 166 of FIG. 1) that when run by one or more processors (e.g., processor 122a, 122b, 162 of FIG. 1) may cause the one or more processors to perform operations 302-316.

At operation 302, the server 160 may assign each computing device 120a-b from among the set of computing devices 120a-b with a respective encryption key 132a-b, similar to that described in FIGS. 1-2.

At operation 304, the first computing device 120a may determine that the first data packet 104 is created at the first computing device 120a, similar to that described in FIGS. 1-2.

At operation 306, the first computing device 120a may encrypt the first data packet 104 with a first encryption key 132a, similar to that described in FIGS. 1-2.

At operation 308, the first computing device 120a may receive a request 108 to communicate the first encrypted data packet 104 to the second computing device 120b, similar to that described in FIGS. 1-2.

At operation 310, the first computing device 120a may encode the first encrypted data packet 104 with the quantum encryption key 138, similar to that described in FIGS. 1-2.

At operation 312, the first computing device 120a may communicate the encoded first data packet 104 to the second computing device 120b, similar to that described in FIGS. 1-2.

At operation 314, the second computing device 120b may determine whether the encoded first data packet 104 was intercepted along its network path to the second computing device 120b, similar to that described in FIGS. 1-2. If it is determined that the encoded first data packet 104 was intercepted along its network path to the second computing device 120b, the method 300 proceeds to operation 316. Otherwise, the method 300 proceeds to operation 318.

At operation 316, the computing device 120b may communicate an alert message 218 indicating that the first data packet 104 was intercepted, e.g., to the server 160 and computing device 120a, similar to that described in FIGS. 1-2.

At operation 318, the computing device 120b may decrypt the encoded first data packet 104 using the quantum encryption key 138, similar to that described in FIGS. 1-2.

While several embodiments have been provided in the present disclosure, it should be understood that the system 100 and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented. In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled, directly coupled, or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein. To aid the Patent Office, and any readers of any patent issued on this application in interpreting the claims appended hereto, applicants note that they do not intend any of the appended claims to invoke 35 U.S.C. § 112(f), as it exists on the date of filing hereof, unless the words "means for" or "step for" are explicitly used in the particular claim.

The invention claimed is:

1. A system comprising:
a memory configured to store a first data packet, and
a first processor, operably coupled to the memory, and
  configured to:

assign each computing device from among a set of computing devices with a respective encryption key, wherein assigning each computing device from among the set of computing devices with the respective encryption key comprises:

assigning a first computing device with a first encryption key; and assigning a second computing device with a second encryption key, wherein the second encryption key is distinct from the first encryption key;

the first computing device comprising a second processor configured to:

determine that the first data packet is created at the first computing device;

in response to determining that the first data packet is created at the first computing device, encrypt the first data packet with the first encryption key;

receive a request to communicate the first encrypted data packet to the second computing device;

in respect to receiving the request, encode the first data packet with a first quantum encryption key, wherein encoding the first data packet with the first quantum encryption key comprises generating a quantum state vector, wherein:

the quantum state vector comprises a set of bit values to be used to form the quantum encryption key; and the first quantum encryption key is associated with a preconfigured quantum state encoding used in encoding the first data packet with the first quantum encryption key; and the preconfigured quantum state encoding comprises a horizontal, a vertical, a diagonal, or a circular polarization scheme, and communicate the encoded first data packet to the second computing device;

the second computing device comprising a third processor configured to:

determine that the encoded first data packet is transmitted to the second computing device without being intercepted, by:

receiving, from the first computing device, a first measurement result associated with the quantum state vector at the first computing device, wherein the first measurement result indicates the preconfigured quantum state encoding associated with the first quantum encryption key;

determining a second measurement result associated with the quantum state vector, wherein the second measurement result indicates a measured quantum state vector using a measurement basis used by the second computing device;

comparing the first measurement result with the second measurement result; and determining that a difference between the first measurement result and the second measurement result is less than a threshold; and in response to determining that the encoded first data packet is transmitted to the second computing device without being intercepted, decrypt the encoded first data packet using the first quantum encryption key.

2. The system of claim 1, wherein the quantum encryption key is formed from the set of bit values obtained from a measurement of the quantum state vector.

3. The system of claim 1, wherein the set of bit values are random bit values.

4. The system of claim 1, wherein the encoded first data packet is communicated to the second computing device over a quantum channel comprising fiber optic communication links.

5. The system of claim 1, wherein the second processor is further configured to:

append the first data packet with a unique serial number, wherein:

when the first data packet comprises an image, the unique serial number is embedded in a pixel of the image; and when the first data packet comprises an audio file, the unique serial number is embedded as frequency bands associated with a portion of the audio file; and track a network path associated with the first data packet by tracking the unique serial number at each network node where the first data packet is received.

6. The system of claim 1, wherein the third processor is further configured to:

determine that the encoded first data packet is intercepted before being received at the second computing device; and in response to determining that the encoded first data packet is intercepted before being received at the second computing device, communicate an alert message to the first processor and the second processor, wherein the alert message indicates the encoded first data packet is intercepted before being received at the second computing device.

7. The system of claim 1, wherein the second processor is further configured to:

receive a second request, from a third computing device, to transmit the first data packet to the third computing device, wherein the second request comprises an Internet Protocol (IP) associated with the third computing device;

determine that the IP associated with the third computing device is not among a list of authorized IP addresses; and in response to determining that the IP associated with the third computing device is not among a list of authorized IP addresses, deny the second request.

8. A method comprising:

assigning, by a first processor associated with a server, each computing device from among a set of computing devices with a respective encryption key, wherein assigning each computing device from among the set of computing devices with the respective encryption key comprises:

assigning a first computing device with a first encryption key; and assigning a second computing device with a second encryption key, wherein the second encryption key is distinct from the first encryption key;

determining, by a second processor associated with the computing device, that a first data packet is created at the first computing device;

in response to determining that the first data packet is created at the first computing device, encrypting, by the second processor, the first data packet with the first encryption key;

receiving, by the second processor, a request to communicate the first encrypted data packet to the second computing device;

in respect to receiving the request, encoding, by the second processor, the first data packet with a first quantum encryption key, wherein encoding the first data packet with the first quantum encryption key comprises generating a quantum state vector, wherein:

the quantum state vector comprises a set of bit values to be used to form the quantum encryption key; and the first quantum encryption key is associated with a preconfigured quantum state encoding used in encoding the first data packet with the first quantum encryption key; and the preconfigured quantum state encoding comprises a horizontal, a vertical, a diagonal, or a circular polarization scheme; and communicating, by the second processor, the encoded first data packet to the second computing device;

determining, by a third processor associated with the second computing device, that the encoded first data packet is transmitted to the second computing device without being intercepted, by:

receiving, from the first computing device, a first measurement result associated with the quantum state vector at the first computing device, wherein the first measurement result indicates the preconfigured quantum state encoding associated with the first quantum encryption key;

determining a second measurement result associated with the quantum state vector, wherein the second measurement result indicates a measured quantum state vector using a measurement basis used by the second computing device;

comparing the first measurement result with the second measurement result; and determining that a difference between the first measurement result and the second measurement result is less than a threshold; and in response to determining that the encoded first data packet is transmitted to the second computing device without being intercepted, decrypting, by the third processor, the encoded first data packet using the first quantum encryption key.

9. The method of claim 8, wherein the quantum encryption key is formed from the set of bit values obtained from a measurement of the quantum state vector.

10. The method of claim 8, wherein the set of bit values are random bit values.

11. The method of claim 8, wherein the encoded first data packet is communicated to the second computing device over a quantum channel comprising fiber optic communication links.

12. The method of claim 8, further comprising:

appending, by the second processor, the first data packet with a unique serial number, wherein:

when the first data packet comprises an image, the unique serial number is embedded in a pixel of the image; and when the first data packet comprises an audio file, the unique serial number is embedded as frequency bands associated with a portion of the audio file; and tracking, by the second processor, a network path associated with the first data packet by tracking the unique serial number at each network node where the first data packet is received.

13. The method of claim 8, further comprising:

determining, by the third processor, that the encoded first data packet is intercepted before being received at the second computing device; and in response to determining that the encoded first data packet is intercepted before being received at the second computing device, communicating, by the third processor, an alert message to the first processor and the second processor, wherein the alert message indicates the encoded first data packet is intercepted before being received at the second computing device.

14. The method of claim 8, further comprising:

receiving, by the second processor, a second request, from a third computing device, to transmit the first data packet to the third computing device, wherein the second request comprises an Internet Protocol (IP) associated with the third computing device;

determining, by the second processor, that the IP associated with the third computing device is not among a list of authorized IP addresses; and in response to determining that the IP associated with the third computing device is not among a list of authorized IP addresses, denying, by the second processor, the second request.

15. A non-transitory computer-readable medium storing instructions that when executed by one or more processors, cause the one or more processors to:

assign, by a first processor associated with a sever, each computing device from among a set of computing devices with a respective encryption key, wherein assigning each computing device from among the set of computing devices with the respective encryption key comprises:

assigning a first computing device with a first encryption key; and assigning a second computing device with a second encryption key, wherein the second encryption key is distinct from the first encryption key;

determine, by a second processor associated with the first computing device, that a first data packet is created at the first computing device;

in response to determining that the first data packet is created at the first computing device, encrypt, by the second processor, the first data packet with the first encryption key;

receive, by the second processor, a request to communicate the first encrypted data packet to the second computing device;

in respect to receiving the request, encode, by the second processor, the first data packet with a first quantum encryption key, wherein encoding the first data packet with the first quantum encryption key comprises generating a quantum state vector, wherein:

the quantum state vector comprises a set of bit values to be used to form the quantum encryption key; and the first quantum encryption key is associated with a preconfigured quantum state encoding used in encoding the first data packet with the first quantum encryption key; and the preconfigured quantum state encoding comprises a horizontal, a vertical, a diagonal, or a circular polarization scheme; and communicate, by the second processor, the encoded first data packet to the second computing device;

determine, by a third processor associated with the second computing device, that the encoded first data packet is transmitted to the second computing device without being intercepted, by:

receiving, from the first computing device, a first measurement result associated with the quantum state vector at the first computing device, wherein the first measurement result indicates the preconfigured quantum state encoding associated with the first quantum encryption key;

determining a second measurement result associated with the quantum state vector, wherein the second measurement result indicates a measured quantum state vector using a measurement basis used by the second computing device;

comparing the first measurement result with the second measurement result; and determining that a difference between the first measurement result and the second measurement result is less than a threshold; and in response to determining that the encoded first data packet is transmitted to the second computing device without being intercepted, decrypt, by the third processor, the encoded first data packet using the first quantum encryption key.

16. The non-transitory computer-readable medium of claim 15, wherein the quantum encryption key is formed from the set of bit values obtained from a measurement of the quantum state vector.

17. The non-transitory computer-readable medium of claim 15, wherein the set of bit values are random bit values.

18. The non-transitory computer-readable medium of claim 15, wherein the encoded first data packet is communicated to the second computing device over a quantum channel comprising fiber optic communication links.

19. The non-transitory computer-readable medium of claim 15, wherein to the instructions further cause the second processor to:

append the first data packet with a unique serial number, wherein:

when the first data packet comprises an image, the unique serial number is embedded in a pixel of the image; and when the first data packet comprises an audio file, the unique serial number is embedded as frequency bands associated with a portion of the audio file; and track a network path associated with the first data packet by tracking the unique serial number at each network node where the first data packet is received.

20. The non-transitory computer-readable medium of claim 15, wherein the instructions further cause the third processor to:

determine that the encoded first data packet is intercepted before being received at the second computing device; and in response to determining that the encoded first data packet is intercepted before being received at the second computing device, communicate an alert message to the first processor and the second processor, wherein the alert message indicates the encoded first data packet is intercepted before being received at the second computing device.

\* \* \* \* \*